United States Patent
Visioli

(10) Patent No.: US 6,818,160 B2
(45) Date of Patent: Nov. 16, 2004

(54) METHOD TO IMPROVE PROPERTIES OF POLY(TRIMETHYLENE TEREPHTHALATE) FILM

(75) Inventor: Donna Lynn Visioli, Lower Gwynedd, PA (US)

(73) Assignee: E. I. du Pont de Nemours and Company, Wilmington, DE (US)

(*) Notice: Subject to any disclaimer, the term of this patent is extended or adjusted under 35 U.S.C. 154(b) by 412 days.

(21) Appl. No.: 10/000,617

(22) Filed: Nov. 15, 2001

(65) Prior Publication Data

US 2002/0117081 A1 Aug. 29, 2002

Related U.S. Application Data

(60) Provisional application No. 60/249,203, filed on Nov. 16, 2000.

(51) Int. Cl.$^7$ ................................. B29C 47/88
(52) U.S. Cl. ................ 264/40.6; 264/177.19; 264/211; 264/212
(58) Field of Search ............... 106/169.33; 528/83; 264/40.6, 177.19, 178 R, 211, 212

(56) References Cited

U.S. PATENT DOCUMENTS

| | | | | |
|---|---|---|---|---|
| 3,889,039 A | * | 6/1975 | Wainer | 428/404 |
| 4,176,224 A | * | 11/1979 | Bier et al. | 528/298 |
| 4,223,113 A | * | 9/1980 | Bier et al. | 525/439 |
| 5,039,780 A | * | 8/1991 | Hashimoto et al. | 528/194 |
| 5,183,623 A | * | 2/1993 | Kawaguichi et al. | 264/544 |
| 5,763,104 A | * | 6/1998 | Stouffer et al. | 528/503 |
| 6,169,143 B1 | * | 1/2001 | Dalgewicz et al. | 525/64 |
| 6,245,844 B1 | | 6/2001 | Kurian et al. | |
| 6,331,344 B1 | * | 12/2001 | Okazaki et al. | 428/141 |
| 6,368,722 B1 | * | 4/2002 | Mimura et al. | 428/474.4 |
| 6,517,762 B1 | * | 2/2003 | Tsunekawa et al. | 264/290.2 |

FOREIGN PATENT DOCUMENTS

| | | |
|---|---|---|
| GB | 578097 | 6/1946 |
| GB | 975355 | 11/1964 |
| JP | 08104763 | 4/1996 |
| WO | WO 00/17265 | 3/2000 |
| WO | WO 00/75251 A1 | 12/2000 |

OTHER PUBLICATIONS

PCT International Search Report for International application No. PCT/US01/43790 dated May 6, 2002.

* cited by examiner

*Primary Examiner*—Mark Eashoo

(57) ABSTRACT

The invention herein provides a method to improve retention of tensile properties upon aging in poly(trimethylene terephthalate) cast film. The method involves first nucleating the poly(trimethylene terephthalate) resin prior to film formation and controlling the quench temperature during casting of the film. The quench temperature should be controlled to a temperature in the range of from about 10° C. below the Tg of the poly(trimethylene terephthalate) to about 15° C. above the Tg of the poly(trimethylene terephthalate).

10 Claims, No Drawings

METHOD TO IMPROVE PROPERTIES OF POLY(TRIMETHYLENE TEREPHTHALATE) FILM

This application claims the benefit of U.S. Provisional Application No. 60/249,203, filed Nov. 16, 2000.

FIELD OF THE INVENTION

This invention relates to films of poly(trimethylene terephthalate). This invention specifically relates to methods to produce cast films of poly(trimethylene terephthalate) which reduce brittleness of the film on thermal aging, among other benefits.

BACKGROUND OF THE INVENTION

Poly(trimethylene terephthalate), herein abbreviated 3GT, also referred to as polypropylene terephthalate, may be useful in many materials and products in which polyesters are currently used, for example films, carpet fibers, textile fibers, miscellaneous industrial fibers, containers and packaging.

British Patent 578,097 disclosed the synthesis of poly (trimethylene terephthalate) in 1941. The polymer itself is currently commercially available from Shell.

Poly(trimethylene terephthalate) has been contemplated for use in films. Japanese Patent Application JP 08104763 A2 discloses polyester films composed of polypropylene terephthalate, wherein the number of carboxyl end groups in the polyester film is no more than 40 eq/t. To date, the drawbacks of films made from 3GT include loss of tensile properties on aging, e.g., a decrease of more than 50% in elongation at break. Aging is related to 'organization' in the glassy regions of the polymer. It is not related to crystallization, which occurs in crystalline regions. Loss in elongation at break is widely used as evidence of aging because elongation is so easy to measure, but other mechanical properties, such as toughness, also decrease. Properties such as heat-sealability, which are related to performance in amorphous regions, are also affected by aging. Aging is accelerated by heating, but will eventually occur even in the absence of heat.

A need still exists for improved cast films of poly (trimethylene terephthalate), and copolymers thereof, which retain tensile properties upon aging.

SUMMARY OF THE INVENTION

The invention herein provides a method to improve the retention of tensile properties upon aging in 3GT cast film comprising the steps of:

(a) prior to film formation, nucleating 3GT resin by adding the mono-sodium salt of a dicarboxylic acid selected from the group consisting of monosodium terephthalate, monosodium napthalene dicarboxylate and monosodium isophthalate as a nucleating agent during the synthesis of the 3GT resin;

(b) casting the nucleated 3GT resin into a film; and (c) controlling the quench temperature during casting of the film to a temperature in the range of about 10° C. below the Tg of the nucleated 3GT resin to about 15° C. above the Tg of the nucleated 3GT resin.

The invention herein also provides a method to improve the retention of tensile properties upon aging in 3GT cast film comprising the steps of:

(a) prior to film formation, nucleating 3GT resin in situ by adding an appropriate sodium containing species to a polymerization reaction mixture comprising a dicarboxylic acid;

(b) casting the nucleated 3GT resin into a film; and (c) controlling the quench temperature of the film during casting to a temperature in the range of about 10° C. below the Tg of the nucleated 3GT resin to about 15° C. above the Tg of the nucleated 3GT resin.

Preferably, the quench temperature ranges from about 30° C. to about 70° C., more preferably from about 40° C. to about 65° C. and most preferably from about 50° C. to about 65° C.

DETAILED DESCRIPTION

Definitions

In this disclosure, the word "copolymer" means a polymer polymerized from two or more monomers, and includes terpolymers, or more precisely, a polymer containing two or more repeat units.

The word "homopolymer" means a polymer containing one repeat unit.

A 3GT homopolymer is intended to mean a polymer substantially derived from the polymerization of 1,3-propane diol with terephthalic acid, or alternatively, derived from the ester-forming equivalents thereof (e.g., any reactants which can be polymerized to ultimately provide a polymer of poly(trimethylene terephthalate).

A 3GT copolymer is intended to mean any polymer comprising (or derived from) at least about 80 mole percent trimethylene terephthalate and the remainder of the polymer being derived from monomers other than terephthalic acid and 1,3-propane diol (or their ester forming equivalents)

Tg means the glass transition temperature of a polymer. Typically this is measured by using a differential scanning calorimeter (DSC) per ASTM D-3417 at a heating rate of 10° C./min for heating and cooling, and the mid-point of inflection is reported.

Description

The invention herein provides a method for improving the tensile properties in 3GT film upon aging. Applicants have found that by nucleating 3GT polymer, or copolymers thereof, and controlling the quench temperature during casting of the film to within a certain range, the resulting cast films have improved retention of tensile properties upon aging, generally improved stability of mechanical properties and specifically improved retention of elongation at break. Additionally, the resulting films are optically clear, making them especially useful in packaging applications. Most recent work shows that films prepared in this way (nucleated, controlled quench temperature) may also be tougher, i.e., have higher burst strength.

Poly(trimethylene terephthalate, herein referred to as 3GT, also referred to as poly(propylene terephthalate) or PPT, is a polyester prepared by the condensation polymerization of 1,3-propane diol and terephthalic acid. Poly (trimethylene terephthalate) may also be prepared from 1,3-propane diol and dimethylterephthalate (DMT) in a two-vessel process using tetraisopropyl titanate catalyst, Tyzor® TPT (a registered trademark of E. I. du Pont de Nemours and Company). Molten DMT is added to 1,3-propane diol and catalyst at about 185° C. in a transesterification vessel, and the temperature is increased to 210° C. while methanol is removed. The resulting intermediate is transferred to a polycondensation vessel where the pressure is reduced to one millibar (10.2 kg/cm$^2$) and the temperature is increased to 255° C. When the desired melt viscosity is reached, the pressure is increased and the polymer may be extruded, cooled and cut into pellets.

The 3GT resin of the invention herein may be a 3GT homopolymer or a copolymer that preferably contains 80% or more of poly(trimethylene terephthalate) or poly(trimethylene naphthalate) in mole percentage, or blends thereof. These may be modified with up to 20 mol percent of polyesters made from other diols or diacids. The most preferred resin is poly(trimethylene terephthalate) homopolymer. Also preferred are blends and copolymers of poly(trimethylene terephthalate).

Other diacids that are useful to polymerize 3GT resin include isophthalic acid, 1,4-cyclohexane dicarboxylic acid, 1,3-cyclohexane dicarboxylic acid, succinic acid, glutaric acid, adipic acid, sebacic acid, 1,12-dodecane dioic acid, and the derivatives thereof such as the dimethyl, diethyl, or dipropyl esters of these dicarboxylic acids.

Other diols include ethylene glycol, 1,4-butane diol, 1,2-propane diol, diethylene glycol, triethylene glycol, 1,3-butane diol, 1,5-pentane diol, 1,6-hexane diol, 1,2-, 1,3- and 1,4-cyclohexane dimethanol, and the longer chain diols and polyols made by the reaction product of diols or polyols with alkylene oxides.

The object of the invention, i.e., improved retention of tensile properties upon aging in 3GT cast film, is achieved due to two processing steps: (1) nucleating the 3GT resin, and (2) controlling the quench temperature upon casting, e.g., the temperature of the chill roll.

The 3GT resin may be nucleated by the addition of a nucleating agent, e.g., monosodium terephthalate, or the nucleating agent may be generated in situ by the addition of an appropriate sodium-containing species to a polymerization reaction mixture comprising terephthalic acid. These methods of nucleation are described in co-pending, commonly-assigned, U.S. patent application Ser. No. 09/273,288, filed on Mar. 19, 1999, and issued as U.S. Pat. No. 6,245,844 B1 on Jun. 12, 2001, incorporated by reference herein. Mono-sodium terephthalate may be admixed to the polyester in various ways in an amount of from about 0.005 to about 2 wt %, preferably from about 0.008 to about 0.8 wt % (which corresponds to 10 ppm to 2000 ppm calculated as sodium) in polymer. It can be added at any time during the synthesis of the 3GT, which in general is carried out by the esterification/transesterification followed by polycondensation process. It is also possible to mix monosodium terephthalate with granular polyester followed by processing in an extruder, which should be considered equivalent steps for purposes of this invention. The monosodium terephthalate may be added as a pure compound or as a masterbatch, in the same or different polyester to which it is being added. Mono-sodium terephthalate can be prepared from disodium terephthalate and phthalic anhydride according to the method described in GB-975355.

Mono-sodium terephthalate or mono-sodium napthalene dicarboxylate may also be generated in situ by the addition of an appropriate sodium-containing species to a polymerization reaction mixture comprising terephthalic acid or napthalene dicarboxylic acid to generate a mono-sodium salt. Suitable sodium-containing species include, e.g., sodium hydroxide, sodium acetate, sodium carbonate, and trisodium phosphate.

The nucleated 3GT resin is then cast, typically by first extruding through a film dye and quenching on a roll or belt. A typical cast film extrusion line includes: volumetric or weight-controlled feeding and blending equipment that prepares the feed-stock polymer; the extruder and controls; a polymer filter to screen out impurities from the melt; a wide, slot-shaped film/sheet die; a chrome-roll takeoff calendar system; conveyor temperature control stations; slitter pull roll station and a winder and sheet stacker or feed to a thermoforming unit for in-line operation. Film or sheet production consists of polymer being extruded through a properly configured die into the nip point of a chrome-roll takeoff system. At the nip point molten polymer is drawn between opposing temperature-regulated chrome rolls, i.e., quench or chill rolls, the guage is initially established and the film surfaces are cooled, forming a skin on both surfaces of the web. The web continues its path around more temperature-regulated chrome rolls for proper thermal and dimensional stabilization.

For the invention herein, the die is preferably a conventional flat film die in which the melt flows from the manifold to a slot leading to the die lips. The die jaws are moveable so that the die opening can be changed to vary to thickness of the film.

During casting, either a temperature-controlled water bath or water-cooled rolls can be used for quenching the hot melt as it exits the die. For both the water bath process and the roll-quenched process, molten polymer is conveyed by the extruder through an adapter into a slit-type die. In the water bath process, the molten polymer film enters a tank of water in which the water temperature is measured by a thermocouple. The molten polymer film is directed to the bottom of the quench tank by a guide shoe or roller which is located either close to the bottom of the tank, or alternatively under the die at one end of the quench tank in combination with second shoe or roller at the other end of the tank. The guide shoe or roller directs the film through the water bath toward pull rolls. The film is drawn out of the quench tank by the pull rolls, trimmed to remove the 'bead' of thicker polymer on the edge which was formed as the molten polymer exits the die, and wound up.

In the roll-quenched process, which is most commonly found in commercial production as discussed above, the molten polymer exiting the die contacts the temperature-controlled, water-cooled quench or chill roll on a tangent to the roll surface. Preferably, static pinning of the web to the chill roll is used to ensure better thickness uniformity for the film. There may be an auxiliary cooling roll(s) beyond this first roll. Beyond the cooling roll(s), the film passes to a set of pull rolls and is trimmed and wound up.

Key to the invention herein is control of the quenching temperature. The Tg of the 3GT (nucleated or not) is typically in the range of about 45° C. to about 55° C. The quenching temperature should be controlled to within a range of about 10° C. below the Tg of the nucleated 3GT resin to a temperature just below the point that the film becomes so soft and rubbery that it will stick to the chill roll, typically no higher than about 15° C. above the Tg of the nucleated 3GT resin. This temperature range generally falls into the range of about 30° C. to about 70° C., preferably in the range of about 40° C. to 65° C., most preferably in the range of about 50° C. to 65° C. If the chill roll temperature is below about 30° C. the desired improvement in aging does not occur. If the chill roll temperature is above about 70° C., the film can stick to the chill roll and is difficult to wind up. This has been observed for films having a thickness of about 15 mils or less. Generally, however, the film thickness can range as high as about 30 mils.

The resulting film is useful in various packaging applications such as lidding, bags, carded packages, stretch or skin packages, blister packages. The film may also be coextruded with, or solution-coated with, a sealant for preparation of tubes, or thermoformed articles (which may or may not be coextruded with additional layers).

EXAMPLES

Example 1–6 and Comparative Examples A–J

A film (50 microns thick) was prepared from nucleated 3GT resin using a 28 mm twin screw extruder with a film die. The 3GT resin was nucleated with monosodium terephthalate. Temperature of the casting drum was varied from minimum to maximum attainable. Elongation at break in the machine direction was measured on each of the resulting films and are reported in Table I. Tables II and III show the same measurements for PET film and unnucleated 3GT for comparison purposes.

Elongation at break was acceptable if the chill roll temperature was above 60° C. The elongation at break was acceptable if it was about 20% or higher after aging. Temperatures higher than 70°C. are not practical because the film sticks to the chill roll. Films were clear under all conditions.

TABLE I

| EX | Chill Roll Temp. °C. | ELONGATION/ Break, as cast, % | ELONGATION/ Break, 8 DAYS/50° C., % |
|---|---|---|---|
| 1 | 20 | 50 | 2 |
| 2 | 40 | 78 | 2 |
| 3 | 50 | 38 | 20 |
| 4 | 60 | 150 | 50 |
| 5 | 70 | 120 | 40 |
| 6 | 80 | 3.4 | |

TABLE II

COMPARATIVE EXAMPLE - PET, IV 0.67, Tg = 81 C

| Ex | Chill Roll Temp. °C. | ELONGATION/ Break, as cast, % | ELONGATION/ Break, 8 DAYS/50 C., % |
|---|---|---|---|
| A | 23 | 3.2 | 3.7 |
| B | 40 | 3.6 | 3.9 |
| C | 50 | 3.3 | 3.9 |
| D | 60 | 3.3 | 3.8 |
| E | 70 | 3.5 | 4.0 |
| F | 80 | 3.4 | 4.3 |
| G | 83 (sticks to roll) | 3.2 | |

TABLE III

COMPARATIVE EXAMPLE - 3GT, unnucleated, Tg 50 C

| Ex | Chill Roll Temp. °C. | ELONGATION/ Break, as cast, % | ELONGATION/ Break, 8 DAYS/50 C, % |
|---|---|---|---|
| H | 23 | 2.5 | 4.1 |
| I | 40 | 2.5 | 4.2 |
| J | 50 | 2.5 | 4.4 |

What is claimed is:

1. A method to improve the retention of tensile properties upon aging in 3GT cast film comprising the steps of:
   (a) prior to film formation, nucleating 3GT resin by adding the mono-sodium salt of a dicarboxylic acid selected from the group consisting of monosodium terephthalate, monosodium napthalene dicarboxylate and monosodium isophthalate as a nucleating agent during the synthesis of the 3GT resin;
   (b) casting the nucleated 3GT resin into a film onto a chill role for quenching;
   (c) controlling the quench temperature of the chill role during casting of the film to a temperature in the range of about 10° C. below the Tg of the nucleated 3GT resin to about 15° C. above the Tg of the nucleated 3GT resin; and
   (d) recovering clear 3GT film.

2. The method of claim 1 wherein the quench temperature is controlled to a temperature in the range of about 30° C. to about 70° C.

3. The method of claim 1 wherein the quench temperature is controlled to a temperature in the range of about 40° C. to about 65° C.

4. The method of claim 1 wherein the quench temperature is controlled to a temperature in the range of about 50° C. to about 65° C.

5. A method to improve the retention of tensile properties upon aging in 3GT cast film comprising the step of:
   (a) prior to film formation, nucleating 3GT resin in situ by adding an appropriate sodium containing species to a polymerization reaction mixture comprising a dicarboxylic acid;
   (b) casting the nucleated 3GT resin into a film onto a chill role for quenching;
   (c) controlling the quench temperature of the chill role during casting to a temperature in the range of about 10° C. below the Tg of the nucleated 3GT resin to about 15° C. above the Tg of the nucleated 3GT resin; and
   (d) recovering clear 3GT film.

6. The method of claim 5 wherein the quench temperature is controlled to a temperature in the range of about 30° C. to about 70° C.

7. The method of claim 5 wherein the quench temperature is controlled to a temperature in the range of about 40° C. to about 65° C.

8. The method of claim 5 wherein the quench temperature is controlled to a temperature in the range of about 50° C. to about 65° C.

9. A method to produce improved 3GT cast film comprising the steps of:
   (a) polymerizing a mixture of trimethylene glycol and terephthallc acid;
   (b) adding a nucleating agent comprising the monosodium salt of a dicarboxylic acid selected from the group consisting of monosodium terephthalate, monosodium napthalene dicarboxylate and monosodium isophthalate, to the mixture of step (a);
   (c) casting a film from the polymerized mixture onto a chill role for quenching while controlling the quench temperature of the chill role to a temperature in the range of about 10° C. below the Tg of the polymerized mixture to about 15° C. above the Tg of the nucleated 3GT resin; and
   (d) recovering clear 3GT film.

10. The method of claim 9 wherein the quench temperature is controlled to a temperature in the range of about 30° C. to about 70° C.

* * * * *